(12) United States Patent
Tabaian

(10) Patent No.: US 11,732,833 B2
(45) Date of Patent: *Aug. 22, 2023

(54) PIPELINE INSPECTION DEVICES AND METHODS

(71) Applicant: Fereydun Tabaian, Lafayette, LA (US)

(72) Inventor: Fereydun Tabaian, Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,202

(22) Filed: Oct. 25, 2021

(65) Prior Publication Data

US 2022/0043331 A1 Feb. 10, 2022

Related U.S. Application Data

(62) Division of application No. 16/573,971, filed on Sep. 17, 2019, now Pat. No. 11,156,911.

(Continued)

(51) Int. Cl.
| | |
|---|---|
| *G06V 10/00* | (2022.01) |
| *F16L 55/38* | (2006.01) |
| *F16L 55/48* | (2006.01) |
| *G03B 37/00* | (2021.01) |
| *G03B 37/04* | (2021.01) |
| *G03B 37/02* | (2021.01) |
| *G03B 37/06* | (2021.01) |
| *G06F 18/21* | (2023.01) |
| *G06V 10/764* | (2022.01) |

(Continued)

(52) U.S. Cl.
CPC .............. *F16L 55/38* (2013.01); *F16L 55/48* (2013.01); *G03B 37/00* (2013.01); *G03B 37/005* (2013.01); *G03B 37/02* (2013.01); *G03B 37/04* (2013.01); *G03B 37/06* (2013.01); *G06F 18/217* (2023.01); *G06V 10/764* (2022.01); *G06V 10/7715* (2022.01); *G06V 10/82* (2022.01); *F16L 2101/30* (2013.01); *H04N 23/51* (2023.01); *H04N 23/555* (2023.01)

(58) Field of Classification Search
CPC ......... G06K 9/6262; H04N 2005/2255; H04N 5/2252; F25J 1/0232; F16D 2500/7041; F02D 9/105; G03B 37/005
See application file for complete search history.

(56) References Cited

U.S. PATENT DOCUMENTS

| | | | |
|---|---|---|---|
| 2013/0147962 A1* | 6/2013 | Siann ..................... | H04N 7/181 348/159 |
| 2015/0192488 A1* | 7/2015 | Xu ........................ | B63G 8/001 702/38 |

(Continued)

*Primary Examiner* — Frank F Huang
(74) *Attorney, Agent, or Firm* — Troutman Pepper Hamilton Sanders LLP; Ryan A. Schneider

(57) ABSTRACT

A pipeline inspection device including a housing, an antenna, an imaging device having one or more lenses, two diaphragms extending from the housing and distal to one another along the length of the housing, the two diaphragms sharing a longitudinal axis with the housing, a processor, a storage device in communication with the processor, and a memory in communication with the processor, storing a machine learning algorithm and instructions to be executed by the processor, wherein the antenna is operable to communicate with a remote transceiver, the remote transceiver being located on a pipeline through which the pipeline inspection device travels. Also disclosed herein are systems and methods for using the same.

20 Claims, 12 Drawing Sheets

Related U.S. Application Data

(60) Provisional application No. 62/732,110, filed on Sep. 17, 2018.

(51) Int. Cl.
    *G06V 10/77*     (2022.01)
    *G06V 10/82*     (2022.01)
    *F16L 101/30*     (2006.01)
    *H04N 23/51*     (2023.01)
    *H04N 23/50*     (2023.01)

(56) References Cited

U.S. PATENT DOCUMENTS

| | | |
|---|---|---|
| 2015/0258568 A1 | 9/2015 | Xu et al. |
| 2016/0258568 A1* | 9/2016 | Mayorov ................. H04Q 9/00 |
| 2019/0331549 A1* | 10/2019 | Randhawa ............... G01M 3/38 |
| 2020/0049301 A1* | 2/2020 | Rasmussen ........... F16L 55/179 |

* cited by examiner

PIPELINE INSPECTION DEVICES AND METHODS

CROSS REFERENCE TO RELATED APPLICATIONS

This is a divisional application of U.S. application Ser. No. 16/573,971, filed 17 Sep. 2019 (now U.S. Pat. No. 11,156,911), which application Ser. No. 16/573,971 claims the benefit of U.S. Provisional Application No. 62/732,110 filed 27 Sep. 2018, each of which is incorporated herein by reference in its entirety as if fully set forth below.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present disclosure relates generally to pipeline inspection devices and methods. Particularly, embodiments of the present disclosure relate to self-sustainable pipeline imaging devices and methods.

2. Description of Related Art

Pipeline inspection devices, such as PIGs, refer to devices that are passed through pipelines or tubing whether for cleaning the pipelines or for monitoring the internal surfaces and thickness (or other properties) of the pipes or tubes. Particularly, pipeline inspection devices can be used to inspect pipelines or tubes from within to check for deposits and inconsistencies and irregularities in the walls of the pipelines or tubes. Inspection can be performed to assess the need for cleaning and/or pipeline repair, or inspection can be performed to assess the effectiveness of cleaning and/or repair. Such devices can also be used for separation of product within the pipe or tube. Although such devices are particularly found used with tubing carrying hydrocarbons subject to high temperatures in oil refinery furnaces, improvements in such devices can greatly expand the design space of piping-heavy industries, such as water treatment, sewage transport, natural gas transport, hydrocarbon refining, hydrocarbon processing, heavy water processing, nuclear reactors, power production, hydroelectric production, and the like. Difficulties arise in such industries, however. Pipeline inspection devices undergo harsh and corrosive conditions, powerful and viscous flow rates, and high temperatures and pressures to obtain data. Additionally, the pipeline inspection devices should be able to reliably inspect pipe walls and produce accurate results for detecting defects and corrosion levels. Such commonly used inspection devices can be bulky, heavy, cumbersome, and unwieldy.

What is needed, therefore, is a pipeline inspection device capable of operating under harsh conditions while also possessing the ability to reliably and dynamically detect corrosion and defects in the pipes. Embodiments of the present disclosure address this need as well as other needs that will become apparent upon reading the description below in conjunction with the drawings.

SUMMARY OF THE INVENTION

The present disclosure relates generally to detection systems and methods. Particularly, embodiments of the present disclosure relate to image-based detection systems and methods.

In an exemplary embodiment, the present invention is a pipeline inspection device comprising a housing, an antenna, an imaging device, a processor, a storage device in communication with the processor, and memory in communication with the processor, storing a machine learning algorithm and instructions to be executed by the processor, wherein the antenna is operable to communicate with a remote transceiver located on a pipeline through which the pipeline inspection device travels, and wherein the instructions, when executed by the processor, cause the pipeline inspection device to image, using the imaging device, an inner surface of the pipeline through which the pipeline inspection device travels to obtain pipeline image data.

The imaging device can have one or more lenses.

The instructions, when executed by the processor, can further cause the pipeline inspection device to scan, using the machine learning algorithm, the pipeline image data to obtain pipeline corrosion data, detect, using the machine learning algorithm, if a defect is present in the pipeline image data, and transmit, from the antenna to the remote transceiver, the pipeline image data and the pipeline corrosion data.

The pipeline inspection device can be operable to withstand a pressure of 3000 psig or greater.

The pipeline inspection device can further comprise a diaphragm extending from the housing, wherein the diaphragm shares a longitudinal axis with the housing. The diaphragm can comprise an odometer arm in contact with the inner surface of the pipeline, and in communication with the memory.

The pipeline inspection device can further comprise two or more sets of extendable arms, wherein each extendable arm extends at an angle from the housing to a contact member operable to contact the inner surface of the pipeline through which the pipeline inspection device travels. The pipeline inspection device can further comprise two or more sets of one or more joining plates, wherein each set of extendible arms is associated with a respective set of one or more joining plates, which each set of one or more joining plates is disposed on a distal end of the extendable arms of the respective set of extendable arms, wherein each set of one or more joining plates together form an annular diaphragm in communication with the pipeline radially around the housing, wherein each annular diaphragm extends from the housing and is distal from one another along the length of the housing, and wherein each diaphragm shares a longitudinal axis with the housing. At least one of the diaphragms can comprise an odometer arm in contact with the inner surface of the pipeline and in communication with the memory.

The memory can be operable to record a speed at which the pipeline inspection device moves within the pipeline, and the angle at which at least one of the extendable arms of each set of extendable arms extends from the housing to the contact member.

In an exemplary embodiment, the present invention is a pipeline inspection device comprising a housing having a length, two or more annular diaphragms extending from the housing and distal each other along the length of the housing, each annular diaphragm sharing a longitudinal axis with the housing, an imaging device having one or more lenses, a processor, and memory in communication with the processor, storing a machine learning algorithm and instructions to be executed by the processor, wherein the pipeline inspection device is operable to travel within a pipeline having an inner surface, withstand a pressure of 3000 psig or greater, and communicate with a remote transceiver, and wherein the instructions, when executed by the processor, causes the pipeline inspection device to image, using the imaging device, the inner surface of the pipeline through which the pipeline inspection device travels to obtain pipeline image data.

The pipeline inspection device can further comprise, for each annular diaphragm, a set of two or more extendable arms, each extendable arm of the set of two or more extendable arms extending at an angle from the housing, and a set of one or more joining plates, wherein each annular diaphragm is formed by a respective set of one or more joining plates disposed on a distal end of each of the extendable arms of a respective set of two or more extendable arms, wherein each annular diaphragm is in communication with the pipeline radially around the housing, and wherein at least one of the extendable arms of each set of two or more extendable arms extends to a contract member operable to contact the inner surface of the pipeline through which the pipeline inspection device travels.

The pipeline inspection device can further comprise an antenna operable to communicate with the remote transceiver, wherein the instructions, when executed by the processor, further causes the pipeline inspection device to scan, using the machine learning algorithm, the pipeline image data to obtain pipeline corrosion data, detect, using the machine learning algorithm, if a defect is present in the pipeline image data, and transmit, from the antenna to the remote transceiver, the pipeline image data and the pipeline corrosion data.

The pipeline inspection device can further comprise a storage device, wherein the instructions further cause the pipeline inspection device to, if a defect is present in the pipeline image data, label the defect in the pipeline image data, store, using the storage device, the pipeline image data in a labeled defect library, and train the machine learning algorithm with the labeled defect library, and wherein the pipeline inspection device is further operable to detect the defect by comparing the pipeline image data to the labeled defect library.

At least one of the annular diaphragms can comprise an odometer arm in contact with the inner surface of the pipeline, and in communication with the memory, and the memory can be operable to record a speed at which the pipeline inspection device moves within the pipeline, and the angle at which at least one of the extendable arms of each set of set of two or more extendable arms extends from the housing to the contact member.

The pipeline image data, the corrosion data, and if a defect is present in the pipeline image data, data representative of the defect can be transmitted from the antenna to the remote transceiver when the antenna is within a predetermined distance from the remote transceiver, and wherein the antenna can be operable to automatically connect to the remote transceiver when within the predetermined distance.

In another exemplary embodiment of the present disclosure, a pipeline inspection device comprises a housing, an antenna, an imaging device including one or more lenses, two diaphragms that can extended from the housing and can be distal to one another along the length of the housing, the two diaphragms can share a longitudinal axis with the housing, a processor, a storage device in communication with the processor, and a memory in communication with the processor, storing a machine learning algorithm and instructions to be executed by the processor, wherein the antenna can be operable to communicate with a remote transceiver, the remote transceiver can placed on a pipeline through which the pipeline inspection device travels.

In any of the embodiments disclosed herein, the pipeline inspection device can be operable to withstand a pressure of 3000 psig or greater.

In any of the embodiments disclosed herein, the two diaphragms can each comprise extendable arms, each extendable arm can include a proximal end and a distal end relative to the housing, and a joining plate can be disposed on the distal end of at least one extendable arm, the joining plate can be operable to interconnect the extendable arms, wherein the extendable arms can be operable to extend such that the joining plate can contact an inner surface of the pipeline.

In any of the embodiments disclosed herein, each of the extendable arms can further comprise a contact member on the distal end of each extendable arm, the contact member can be operable to contact the inner surface of the pipeline.

In any of the embodiments disclosed herein, the two diaphragms can further comprise an odometer arm in contact with an inner surface of the pipeline and can be in communication with a sensor.

In any of the embodiments disclosed herein, the sensor can be operable to record at least one of a speed at which the pipeline inspection device moves within the pipeline, a speed at which the odometer arm moves along the inner surface of the pipeline, and a degree at which the extendable arms are extended (or the degrees at which each of the extendable arms are extended should they differ among themselves).

In any of the embodiments disclosed herein, the instructions can further cause the device to label the defect in the pipeline image data, store, using the storage device, the pipeline image data in a labeled defect library, and train the machine learning algorithm with the labeled defect library, wherein the device can be operable to detect the defect by comparing the pipeline image data to the labeled defect library.

In any of the embodiments disclosed herein, the pipeline image data, the corrosion data, and the first defect can be transmitted from the antenna to the remote transceiver when the antenna is within a predetermined distance from the remote transceiver, and the antenna can be operable to automatically connect to the remote transceiver when within the predetermined distance.

In an exemplary embodiment, the present invention is a method for pipeline inspection comprising deploying, in a pipeline, the pipeline inspection device according to any of the embodiments, and imaging, using the imaging device, the inner surface of the pipeline.

The method for pipeline inspection can further comprise scanning, using the machine learning algorithm, pipeline image data obtained by the imaging by the imaging device, to obtain pipeline corrosion data, and detecting, using the machine learning algorithm, if a defect is present in the pipeline image data.

The method for pipeline inspection can further comprise labeling the defect in the pipeline image data if a defect is present in the pipeline image data, storing, using a storage device, the pipeline image data in a labeled defect library, and training the machine learning algorithm with the labeled defect library, wherein the detecting comprises comparing the pipeline image data to the labeled defect library.

The method for pipeline inspection can further comprise recording a speed at which the pipeline inspection device travels within the pipeline.

In another embodiment of the present disclosure, a method for pipeline inspection comprises deploying, in a pipeline, a pipeline inspection device comprising two diaphragms, imaging, using an imaging device connected to the pipeline inspection device, an inner surface of the pipeline to obtain pipeline image data, scanning, using a machine learning algorithm, the pipeline image data to obtain pipeline corrosion data, and detecting, using the machine learning algorithm, a defect present in the pipeline image data, wherein the two diaphragms can be extended from the pipeline inspection device and can be distal to one another along the length of the pipeline inspection device, and the two diaphragms can share a longitudinal axis with the pipeline inspection device.

In any of the embodiments disclosed herein, the pipeline inspection device is operable to withstand a pressure of 3000 psig or greater.

In any of the embodiments disclosed herein, the method for pipeline inspection can further comprise labeling the defect in the pipeline image data, storing, using a storage device, the pipeline image data in a labeled defect library, and training the machine learning algorithm with the labeled defect library, wherein the detecting comprises comparing the pipeline image data to the labeled defect library.

In any of the embodiments disclosed herein, the deploying can comprise extending extendable arms from the two diaphragms, each of the extendable arms can have a proximal end and a distal end relative to the pipeline inspection device, contacting, with contact members disposed on the distal end of each of the extendable arms, the inner surface of the pipeline, and deploying an odometer arm in contact with the inner surface of the pipeline and in communication with a sensor connected to the pipeline imaging device.

In any of the embodiments disclosed herein, the method can further comprise recording, with a sensor one or more of a speed at which the pipeline inspection device moves within the pipeline, a speed at which the odometer arm moves along the inner surface of the pipeline, and a degree at which the extendable arms are extended.

Another exemplary embodiment of the present disclosure can provide a pipeline inspection device comprising a housing, an imaging device having one or more lenses, and two diaphragms extending from the housing and can be distal to one another along the length of the housing, the two diaphragms can share a longitudinal axis with the housing.

In any of the embodiments disclosed herein the pipeline inspection device can be operable to withstand a pressure of 3000 psig or greater.

In any of the embodiments disclosed herein, the two diaphragms can each comprise extendable arms, each extendable arm having a proximal end and a distal end relative to the housing, and a joining plate disposed on the distal end of at least one extendable arm, the joining plate operable to interconnect the extendable arms, wherein the extendable arms can be operable to extend such that the joining plate contacts an inner surface of the pipeline.

In any of the embodiments disclosed herein, each of the extendable arms can further comprise a contact member on the distal end of each extendable arm, the contact member operable to contact the inner surface of the pipeline.

In any of the embodiments disclosed herein, the two diaphragms can further comprise an odometer arm in contact with an inner surface of the pipeline and can be in communication with a sensor.

In any of the embodiments disclosed herein, the sensor can be operable to record at least one of a speed at which the pipeline inspection device moves within the pipeline, a speed at which the odometer arm moves along the inner surface of the pipeline, and a degree at which an extendable arm is extended.

These and other aspects of the present disclosure are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAIL DESCRIPTION OF THE INVENTION

Figure 1:
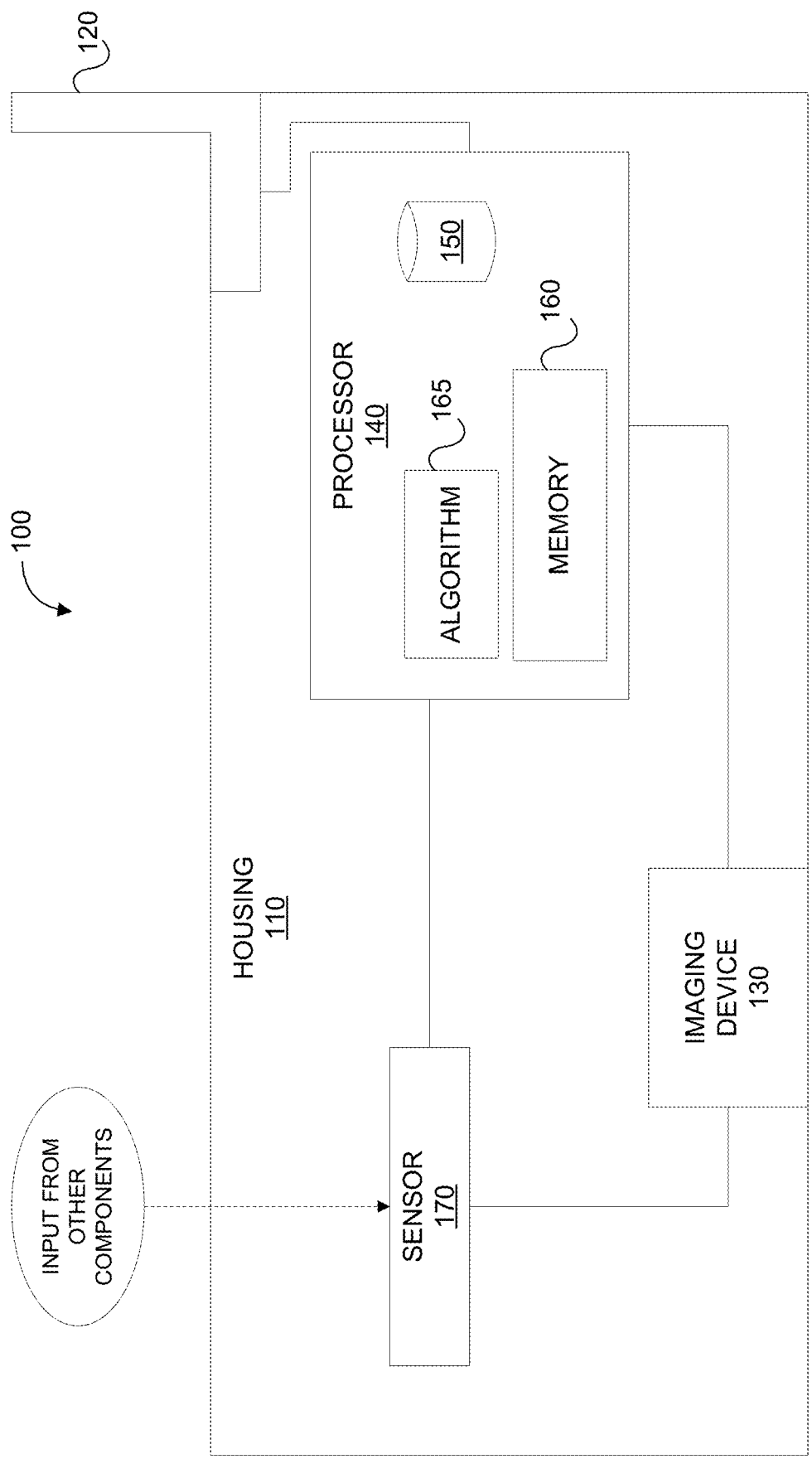
FIG. 1 illustrates a cross-sectional view of a pipeline inspection device according to some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

As described above, a major problem with developments in pipeline inspection devices is the need for such devices to withstand harsh and corrosive conditions, powerful and viscous flow rates, and high temperatures and pressures to obtain data. Additionally, the pipeline inspection devices should be able to reliably inspect pipe walls and produce accurate results for detecting defects and corrosion levels. Improvements in pipeline inspection devices can improve product lifetimes and greatly expand the design space of piping-heavy industries, such as water treatment, sewage transport, natural gas transport, hydrocarbon refining, hydrocarbon processing, heavy water processing, nuclear reactors, power production, hydroelectric production, and the like. What is needed, therefore, is a pipeline inspection device capable of operating under harsh conditions while also possessing the ability to reliably and dynamically detect corrosion and defects in the pipes.

In contrast to previous developments in pipeline inspection technology, the present disclosure can provide improved pipeline inspection devices and methods utilizing improved data transfer and data processing techniques in concert with advanced in-pipeline mechanisms to expand the operating capabilities of pipeline inspection devices. In order to improve the operating capabilities of such devices in a pipeline, embodiments of the present disclosure can provide a pipeline inspection device with a housing and diaphragms extending from the housing and positioned along the longitudinal axis of the housing separated by a certain distance. The housing can withstand the harsh operating conditions in the pipe while the diaphragms provide stability, speed control, and sensors for other inspection parameters, such as flow rate, movement speed, pipe smoothness, pipe diameter, pipe deformation, and the like. The housing can protectively contain an imaging device for collecting pipeline image data, a processor, a storage device, and a memory for processing the pipeline image data, and an antenna for transmitting the data out of the pipeline.

When processing the data obtained from the imaging device, the pipeline inspection device can utilize image processing techniques to determine pipe properties, such as corrosion data or defect data. For example, the pipeline inspection device can use a machine learning algorithm to analyze pipeline images and detect defects in the pipe. The machine learning algorithm can learn and improve with time, as each detected defect can be labeled and stored in a labeled defect library for training the machine learning algorithm or other machine learning algorithms. The data processed by the device can then be transmitted out of the device via the antenna. In some embodiments, the antenna can transmit the data to remote transceivers positioned along the pipeline. The antenna can be operable to automatically connect to the remote transceiver whenever the device is within range and can automatically transmit the pipeline data to the remote transceiver when connected. In this manner, the present disclosure can provide a pipeline inspection device capable of operating under harsh pipeline conditions, able to sense a wide variety of pipeline parameters, and efficiently process and transmit pipeline data obtained during use.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Embodiments of the present disclosure can provide a pipeline inspection device comprising a housing able to withstand harsh operating conditions. The device can further comprise diaphragms extending from the housing and positioned along the longitudinal axis of the housing separated by a certain distance. The diaphragms can provide stability, speed control, and sensors for other inspection parameters, such as flow rate, movement speed, pipe smoothness, pipe diameter, pipe deformation, and the like. In some embodiments, the diaphragms can comprise extendable arms and joined by a joining plate and operable to extend the extendable arms such that the joining plate contacts the pipe. In other words, the diaphragms can expand and contract (via the extendable arms) such that the device can contact the pipe during use (via the joining plate). In this manner, the diaphragms can sense a speed of the device relative to the wall, as well as detecting pipe deformations, smoothness, size, and the like.

In some embodiments, the device can utilize an imaging device to image the interior of the wall and process the image data. Images can be captured by the imaging device and stored and/or processed using storage device, memory, processors, and other components contained within the housing. Also disclosed herein are methods for processing images obtained from a pipeline inspection device. For example, the device can have a library of defect images, and can compare image data to the library to determine if a defect is present. The device can also detect other pipe properties, such as a level of corrosion. The processing can be accomplished using machine learning algorithms, and the algorithms can learn, train, and adapt to defects by expanding the library of defect images as new defect images are obtained.

The data processed by the device can then be transmitted out of the device via the antenna. In some embodiments, the antenna can transmit the data to remote transceivers positioned along the pipeline. The antenna can be operable to automatically connect to the remote transceiver whenever the device is within range and can automatically transmit the pipeline data to the remote transceiver when connected. In this manner, the present disclosure can provide a pipeline inspection device capable of operating under harsh pipeline conditions, able to sense a wide variety of pipeline parameters, and efficiently process and transmit pipeline data obtained during use.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 illustrates a complete cross-sectional view of pipeline inspection device 100. As shown, pipeline inspection device 100 can comprise housing 110, antenna 120, imaging device 130, processor 140, storage device 150, and memory 160. In some embodiments, memory 160 can store additional components, such as machine learning algorithm 165, operating systems, programs, instructions, and the like. In some embodiments, pipeline inspection device 100 can further comprise sensor 170 for sensing certain parameters during pipeline inspection and relaying the parameters to other components, such as processor 140 or storage device 150. It is to be understood that the components described herein can be in communication (i.e., electrical and/or informational) with each other, and can be physically arranged in any number of configurations desired by one of ordinary skill in the art. Further, it is to be understood that other components desired by one of skill in the art can be present, but not show, such as transducers, transmitters, transceivers, global position system trackers, positioning mechanisms and the like.

Pipeline inspection device 100 can be operable to provide image processing of the interior of a pipeline for corrosion and defect detection. Pipeline inspection device 100 can obtain pipeline image data from the pipeline using imaging device 130 and provide the pipeline image data to processor 140 and storage device 150, where the pipeline image data can be processed by memory 160 and machine learning algorithm 165. During processing, machine learning algorithm 165 can scan the pipeline image data to detect pipeline corrosion data, such as a level of corrosion, and can also detect any defects present in the pipeline image data. Further details on the scanning and detecting of corrosion data and defect data can be found outlined in FIG. 6, FIG. 7, FIG. 8, and FIG. 9. For example, detecting corrosion data and defects can be done by a wavelet-based transform into a feature space, or a transformation into feature space based on learned data and color data.

In some embodiments, any detected defects can be labeled as such in the pipeline image data and stored (e.g., at storage device 150). Storage device 150 can additionally contain a labeled defect library. The labeled defect library can store detected defects with their labels obtained from imaging device 130. In this manner, the labeled defect library can constantly expand as pipeline inspection device 100 finds new defects. In some embodiments, the labeled defect library can additionally comprise manually labeled data (i.e., training data). Machine learning algorithm 165 can be trained using the labeled defect library. The labeled defect library can also be used by machine learning algorithm 165 to compare to received pipeline image data to determine if a defect is present. In this manner, machine learning algorithm 165 can be constantly trained and improved in defect detection by training using an ever-expanding labeled defect library. Machine learning algorithm 165 can also utilize such methods to adapt to new environments and constantly improve. For example, machine learning algorithm 165 can comprise a convolutional neural network and can train using the labeled defect library to improve a mapping process to map the pipeline image data to a feature space based on the labeled data. Such an embodiment can provide machine learning algorithm 165 for a fast and dynamic way to obtain data for data augmentation.

The pipeline image data discussed above can be obtained by imaging device 130. Imaging device 130 can be operable to provide pipeline image data to pipeline inspection device through a variety of imaging techniques, such as infrared, x-ray, laser, ultrasound, photography, and the like. It is understood that the imaging techniques utilized by imaging device 130 can be used interchangeably depending on environment, operating conditions, and general desire by one of skill in the art. Regardless, the data obtained by imaging device 130 can be processed according to the techniques discussed above. The image data can be obtained continuously during operation or can be obtained intermittently based on a trigger condition. A trigger condition can be detected by other components of pipeline inspection device 100 and can indicate that imaging can begin at imaging device 130. For example, if sensor 170 detects a leak or change in flow rate, imaging device 130 can begin imaging the pipeline. A detailed example of imaging device 130 according to some embodiments of the present disclosure can be found depicted in FIG. 5.

Figure 5:
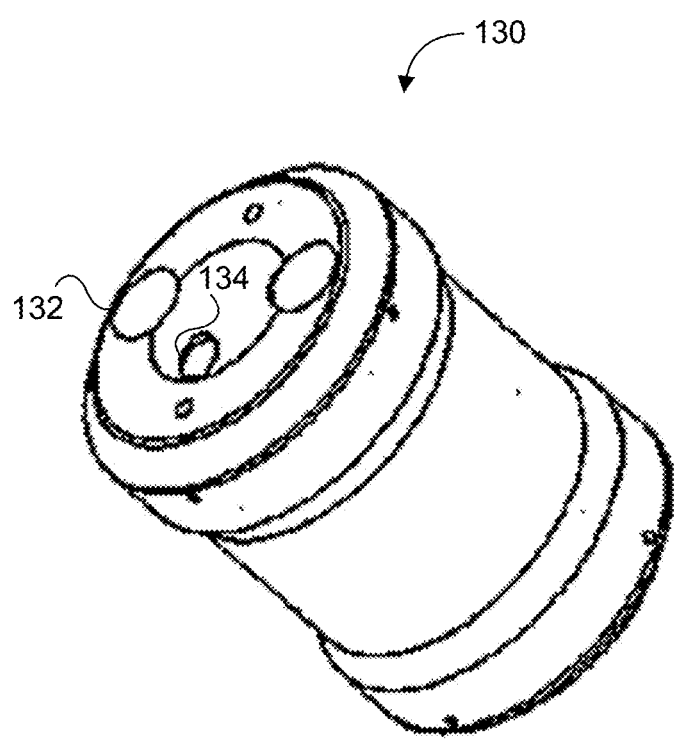
FIG. 5 illustrates an isometric view of an imaging device according to some embodiments of the present disclosure.

FIG. 5 illustrates an example of imaging device 130 according to some embodiments of the present disclosure. As shown, imaging device 130 can comprise lens 132. Lens 134 can be in the form of an optical window (or optical windows) allowing imaging device 130 access to image the pipeline. Lens 134 can comprise materials capable of withstanding the harsh operating conditions in the pipeline, such as sapphire, BK7 glass, or any other strong, transparent material. Furthermore, lens 134 can be operable to withstand a wide range of acidic and basic conditions. In some embodiments, lens 134 can comprise more than one lens 134. Imaging device 130 can also comprise light source 134 operable to illuminate the area of the pipeline being imaged by imaging device 130. For example, imaging device 130 can comprise a light-emitting diode (LED) to illuminate the pipeline during imaging. Light source 134 can also change based on the imaging technique being employed by imaging device 130. For instance, light source 134 can be provided by an LED for imaging, and light source 134 can then turn off for infrared imaging. Thus, light source 134 and imaging device 130 can provide for a variety of different imaging techniques during operation.

In some embodiments, sensor 170 can comprise various components to measure a variety of parameters. For example, sensor 170 can comprise an acoustic emission sensor to measure acoustic transmission in pipeline 200 and detect leaks. Additionally, the acoustic emission sensor can be provided samples to establish a baseline behavior for pipeline 200. Acoustic data obtained from sensor 170 can also be processed by processors 140. For example, acoustic data can be processed using fast Fourier transforms and the like. In some embodiments, sensor 170 can further comprise temperature sensors and pressure transducers to keep track of conditions in the pipeline. Anomalies in the temperature and pressure data can indicate a defect and can alert imaging device 130 to begin imaging pipeline 200. In some embodiments, sensor 170 can further comprise a gyroscope. In such an embodiment, sensor 170 can better predict the orientation of pipeline inspection device 100 to more accurately position the location of defects in pipeline 200. In some embodiments, sensor 170 can further comprise speedometers to measure a speed at which pipeline inspection device 100 travels and a distance covered through pipeline 200. In some embodiments, sensor 170 can further comprise recording devices to record audio transmissions or other data obtained by sensor 170. Other components of sensor 170 may be present to measure additional parameters as desired by one of skill in the art.

In some embodiments, housing 110 can provide secure containment of various components of pipeline inspection device 100. For example, housing 110 can contain processor 140, storage device 150, and memory 160 to provide protection to the components from the harsh conditions in the pipeline. Other components of pipeline inspection device 100 can be mounted on an exterior surface of housing 110, such as imaging device 130 or antenna 120. However, such components can also be contained within housing 110. Components on the exterior of housing 110 can have similar properties as housing 110 to withstand the harsh operating conditions of the pipeline. Housing 110 can therefore be provided in a variety of shapes capable of providing a hollow interior for protecting components within itself, while provide exterior surfaces for other components to be mounted. Suitable examples of shapes for housing 110 can include, but are not limited to, cylinders, rectangular prisms, cuboids, elliptical cylinders, spheres, and the like.

Housing 110 can be made from various materials able to withstand harsh operating conditions, such as high pressure, temperature, shear rate, flow rate, and the like. For example, housing 110 can comprise stainless steel. Housing 110 can be operable to withstand up to 3000 psig in pressure during operation (e.g., 3000 psig or less, 2900 psig or less, 2800 psig or less, 2700 psig or less, 2600 psig or less, 2500 psig or less, etc.), as well as pressures greater than 2000 psig (e.g., 2000 psig or greater, 2100 psig or greater, 2200 psig or greater, 2300 psig or greater, 2400 psig or greater, 2500 psig or greater, etc.). Such embodiments of housing 110 can provide adequate protection to the components of pipeline inspection device 100 to obtain and process pipeline imaging data. Additionally, housing 110 can comprise aluminum. Such an embodiment can provide for a lightweight and high-strength housing, thus improving over heavy and bulky alternatives.

Figure 2:
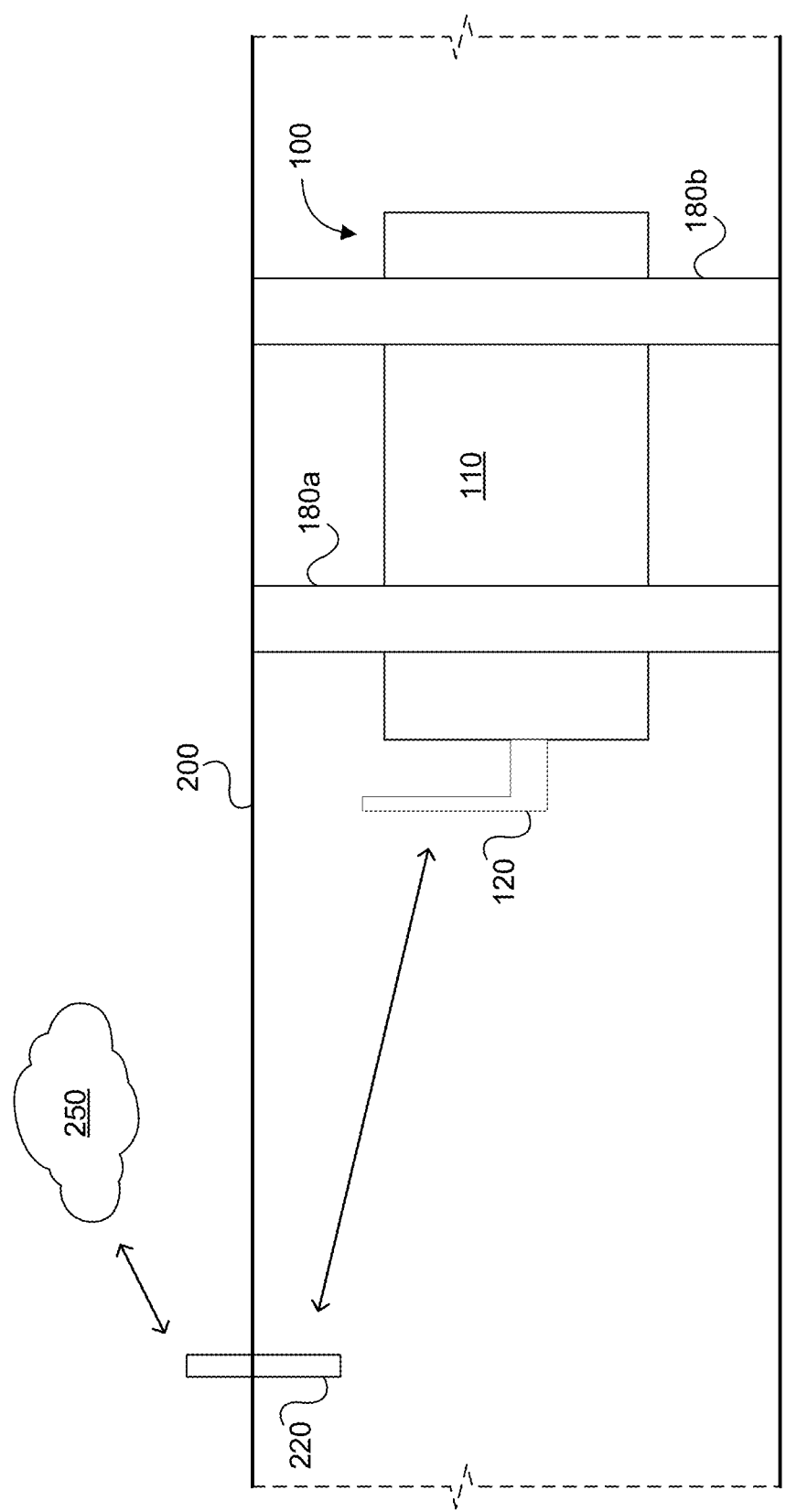
FIG. 2 illustrates a side view of a pipeline inspection device in a pipeline according to some embodiments of the present disclosure.

After obtaining pipeline imaging data and subsequent processing to obtain corrosion data and detect defects, data from within pipeline inspection device 100 can be transmitted out of pipeline inspection device 100 via antenna 120. FIG. 2 illustrates a cross-sectional view of pipeline 200 in which pipeline inspection device 100 is obtaining imaging data. As shown, data can be transmitted from antenna 120 to remote transceiver 220 placed on pipeline 200. Past solutions for pipeline inspection devices required lengthy and bulky cables to provide for the transmittance of data. Alternatively, prior solutions had to store data within the device until the journey through the pipeline was complete. Embodiments of the present disclosure, however, can provide a manner in which pipeline inspection device can transmit processed data, via antenna 120, out of pipeline 200 via remote transceiver 220. In some embodiments, remote transceiver 220 can further transmit the data to other systems, illustrated by network 250 in FIG. 2. However, remote transceiver 220 can transmit the data to systems such as computing devices, storage devices, display devices, and the like. Thus, remote transceiver 220 can allow for communication between pipeline inspection device 100 (contained in pipeline 200) and the outside world.

In some embodiments, antenna 120 can be operable to automatically connect to remote transceiver 220 when antenna 120 (and therefore pipeline inspection device 100) is within a predetermined distance from remote transceiver 220. When the automatic connection occurs, the data transfer can be initiated between antenna 120 and remote transceiver 220. Once pipeline inspection device 100 moves out of the predetermined distance, the automatic connection and thus the data transfer can be terminated between antenna 120 and remote transceiver. Antenna 120 can also be operable to be protected from the conditions in pipeline 200. For example, antenna 120 can be housed within housing 110. In other embodiments, if antenna 120 is desired to be on an exterior surface of housing 110, antenna 120 can be encased in any material operable to withstand the conditions of the pipeline.

In some embodiments, more than one remote transceiver 220 can be placed along pipeline 200 such that antenna 120 is within the predetermined distance of at least one remote transceiver 220. Such an embodiment can provide pipeline inspection device a constant connection to the outside world and can allow for continuous data flow from pipeline inspection device 100. In some embodiments, remote transceiver 220 can be placed on an inner surface of pipeline 200, an outer surface of pipeline 200, or within pipeline 200. In some embodiments, remote transceiver 220 can be integral with pipeline 200 or can extend from pipeline 200. Remote transceiver 220 can also be placed in any combination of configurations discussed above to provide for adequate connection to antenna 120. Additionally, to facilitate communication and data transfer at any time when pipeline inspection device 100 is within range of remote transceiver 220, pipeline inspection device can be self-powered. For example, a power supply can be contained within housing 110 to power the components of pipeline inspection device 100. Suitable examples of a power supply can include, but are not limited to, batteries, generators, solar panels, or other energy-generating devices, and the like.

Figure 3:
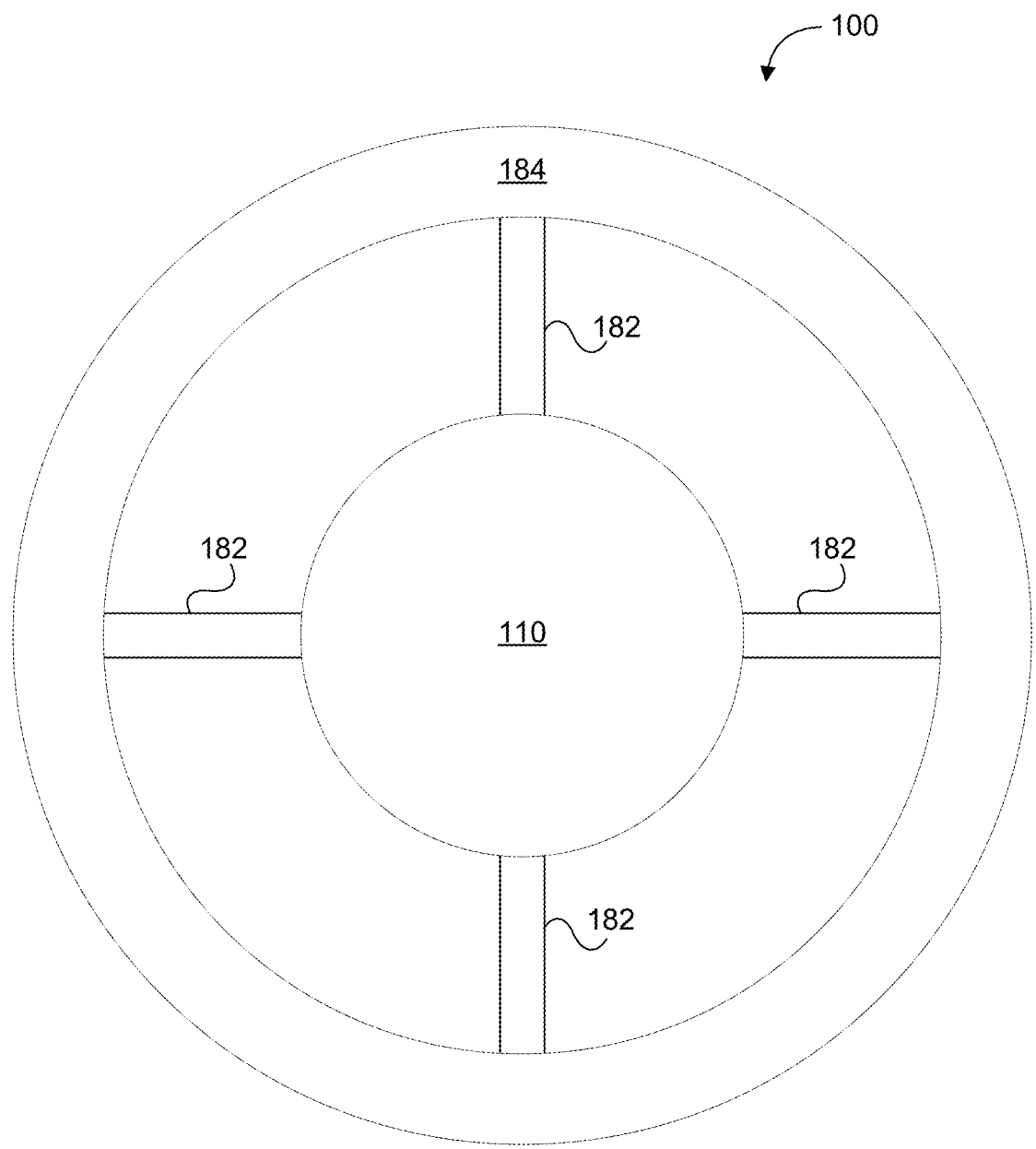
FIG. 3 illustrates a front or back view of a pipeline inspection device according to some embodiments of the present disclosure.

Also as shown in FIG. 2, pipeline inspection device 100 can comprise two diaphragms 180 (as depicted by diaphragms 180A and 180B) extending from housing 110 and distal one another along the length of housing 110 and sharing a longitudinal axis with housing 110. This can also be seen as illustrated in FIG. 3. In some embodiments, as shown in FIG. 3, each of diaphragms 180A and 180B can comprise extendable arms 182. Extendable arms 182 can have a proximal end and a distal end relative to housing 110. Diaphragms 180A and 180B can further comprise a joining plate 184 disposed on the distal end of at least one of extendable arms 182. Joining plate 184 can interconnect extendable arms 182 to provide added structural integrity to diaphragms 180A and 180B. Such structural integrity can allow for diaphragms 180A and 180B to cause pipeline inspection device to traverse pipeline 200. In some embodiments, diaphragms 180A and 180B can comprise any material suitable for the harsh operating conditions of pipeline 200, such as stainless steel or aluminum. In other embodiments, diaphragms 180A and 180B can comprise polyurethane or other hard plastics. Such an embodiment can provide for additional flexibility, reduced weight, and resistance to harsh conditions. The used of flexible, lightweight materials in diaphragms 180A and 180B can further improve pipeline inspection device over heavy, bulky alternatives.

As shown, diaphragms 180A and 180B can be operable to extend such that they contact an inner surface of pipeline 200. Diaphragms 180A and 180B can be oriented to cause pipeline inspection device 100 to traverse pipeline 200 in a desired direction. The rate of travel of pipeline inspection device 100 can be controlled by automatic braking devices of by pipeline fluid bypassing techniques. Diaphragms 180A and 180B can be shaped so as to entrap fluid moving within pipeline 200 and move pipeline inspection device 100 therethrough in a conventional manner. Diaphragms 180A and 180B are illustrated and described in greater detail with regard to FIG. 4A, FIG. 4B, FIG. 4C, and FIG. 4D, wherein diaphragms 180A and 180B are described as diaphragm 180.

FIGS. 4A-d depict example illustrations of diaphragm 180 according to some embodiments of the present disclosure. As shown, diaphragm 180 can comprise extendable arms 182 and joining plate 184. In some embodiments, each of extendable arms 182 can further comprise contact member 482 to contact pipeline 200. Contact members 482 can provide an impeding surface against pipeline 200 to control the speed at which pipeline inspection device travels, such as packers, sealers, rollers, plates, elastomeric discs, and the like. In some embodiments, diaphragm 180 can further comprise odometer arm 186 to contact pipeline 200. Odometer arm 186 can be in communication with, for example, sensor 170 to measure a speed at which odometer arm 186 is traveling along pipeline 200. The speed, as one would appreciate, can be indicative of the overall speed of pipeline inspection device 100. Sensor 170 can also be operable to measure a degree at which the extendable arms are extended, indicative of, for example, a diameter of pipeline 200. Odometer arm 186 can comprise impeding surfaces like contact members 482, such as packers, sealers, rollers, plates, elastomeric discs, and the like. For example, odometer arm 186 can comprise an elastomeric disc to spin in contact with pipeline 200 to obtain a speed for sensor 170. Additionally, in some embodiments, diaphragm 180 can further comprise mounting bracket 188 to provide for attachment to housing 110.

Figure 4A:
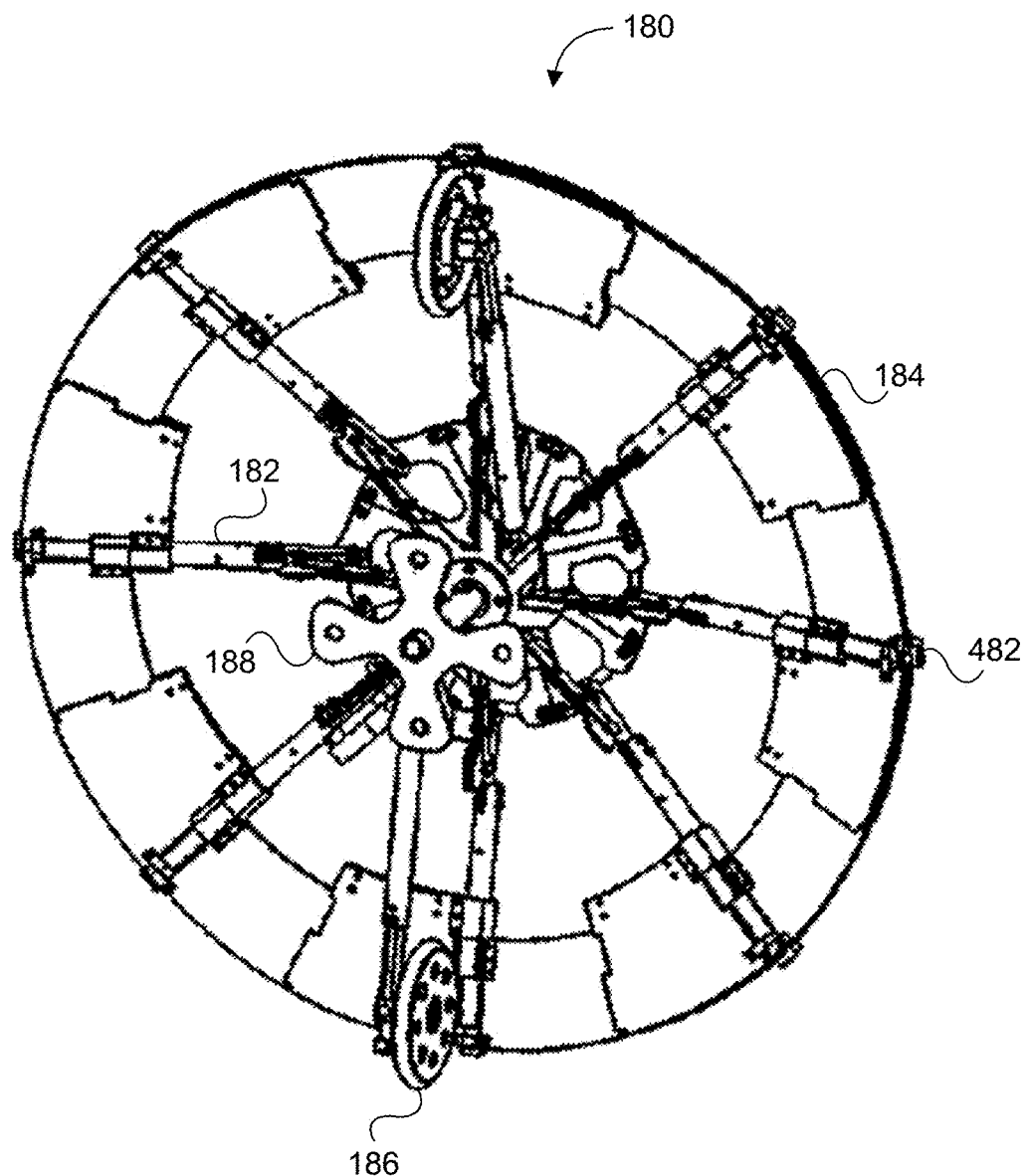
FIG. 4A illustrates a back-isometric view of a diaphragm fully extended according to some embodiments of the present disclosure.
Figure 4B:
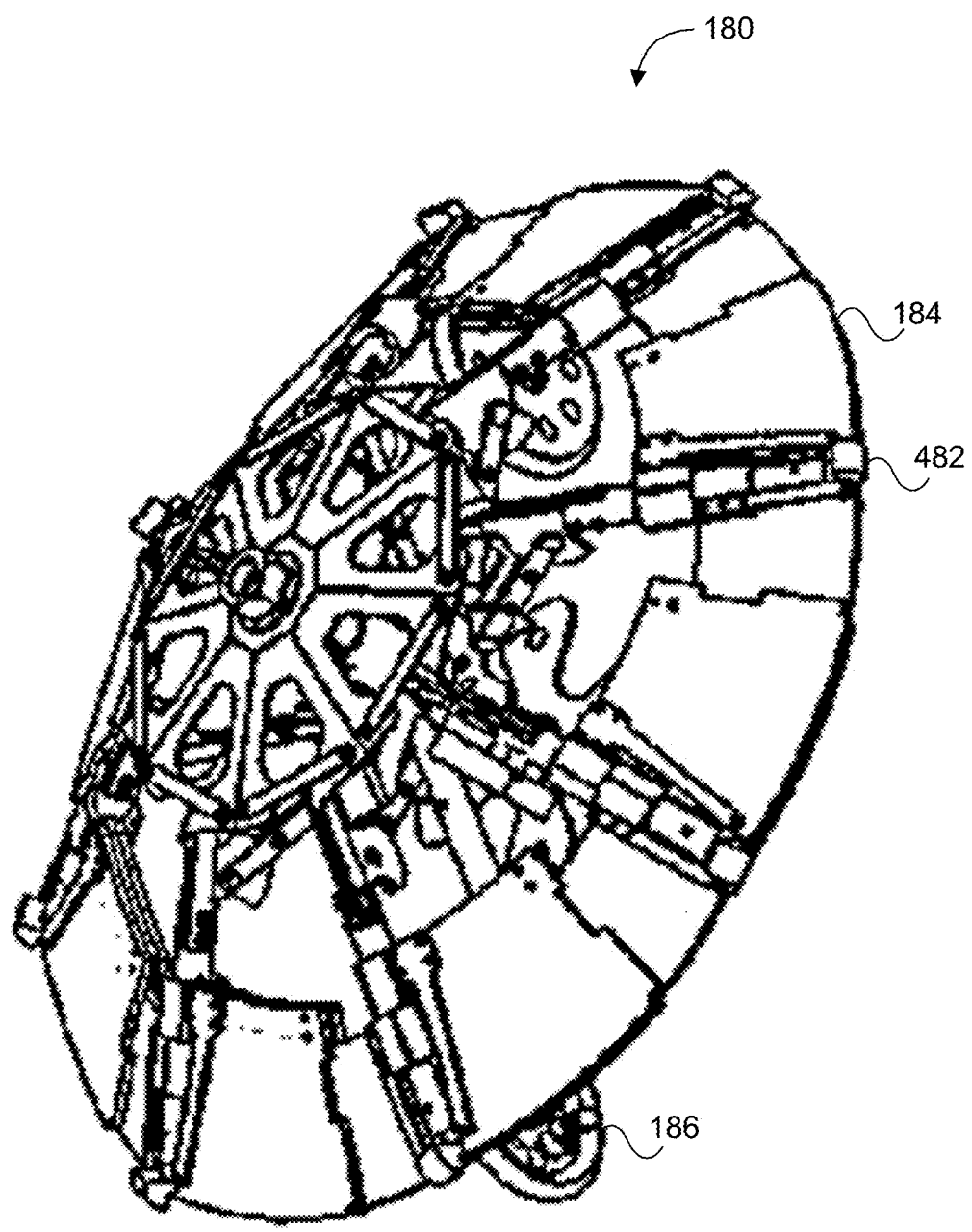
FIG. 4B illustrates a front-isometric view of a diaphragm extended according to some embodiments of the present disclosure.
Figure 4C:
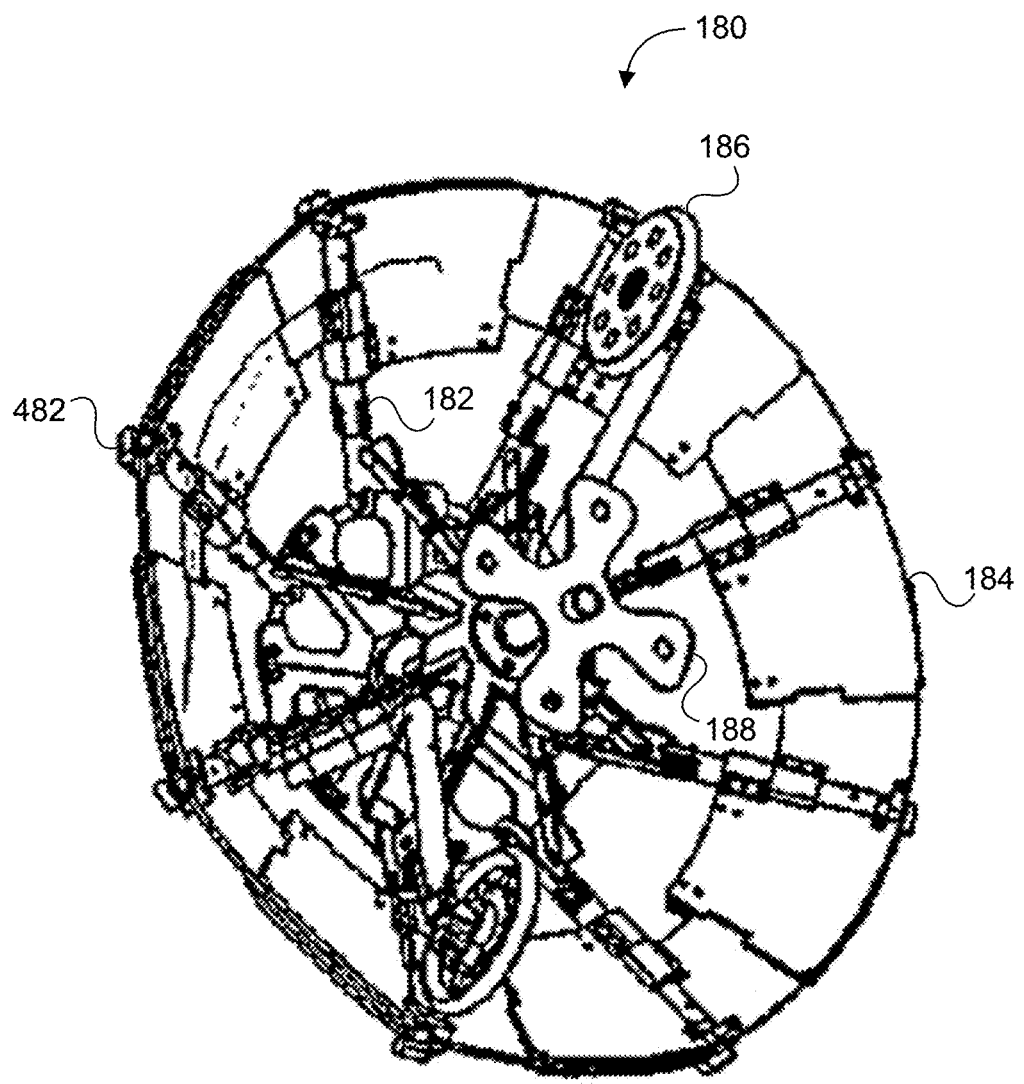
FIG. 4C illustrates a back-isometric view of a diaphragm extended according to some embodiments of the present disclosure.
Figure 4D:
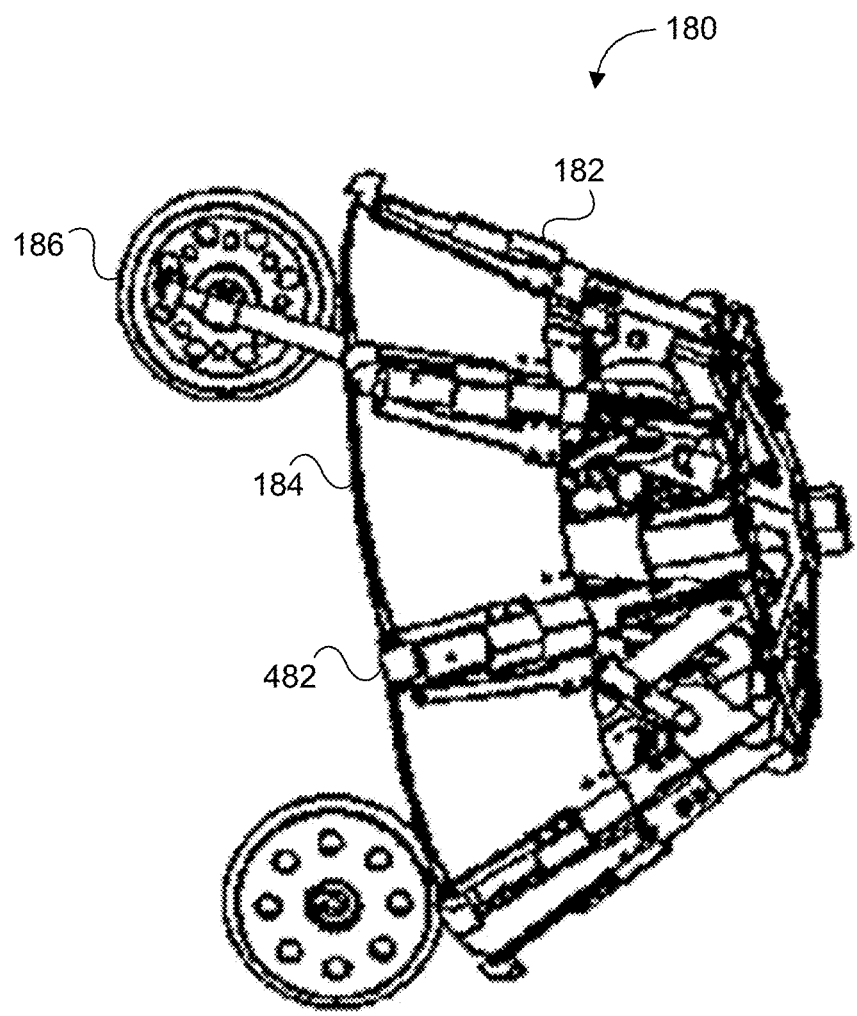
FIG. 4D illustrates a side-isometric view of a diaphragm compressed according to some embodiments of the present disclosure.

In some embodiments, each of extendable arms 182 need not be extended to the same degree. For example, when encountering a dent in pipeline 200, extendable arms 182 in contact with the dent may contract to allow passage of pipeline inspection device 100, while extendable arms 182 not in contact with the dent can remain extended. As such, sensor 170 can record the degree at which extendable arms were extended and can indicate that extendable arms 182 contacting the dent were extended to a lesser degree than normal. The data can then be processed as a dent defect in pipeline 200 and recorded. Such an embodiment can also allow diaphragms 180 to accommodate travel through pipes of varying sizes, because extendable arms 182 can expand and contract to fit the inner surface of the pipeline constantly even as the size changes. Diaphragm 180 can be seen in a fully extended state in FIG. 4A, whereas FIG. 4D illustrates diaphragm 180 in a fully contracted state.

To accommodate varying degrees of extension with extending arms 182, joining plate 184 can be flexible in some embodiments. Joining plate 184 can flex and bend along with extendable arms 182 and remain in contact with the inner surface of pipeline 200. In some embodiments, joining plate 184 can comprise a plurality of joining plates. Such an embodiment can allow various joining plates to expand and contract along with extendable arms 182 in concert with the contours of the inner surface of pipeline 200. Joining plate 184 can additionally have a desired level of porosity to allow fluid to flow through diaphragm 180. Allowing fluid to pass through joining plate 184 can greatly reduce the forces exerted on diaphragm 180 and, thus, the speed at which pipeline inspection device 100 travels. The level at which fluid flows through joining plate 184 can be adjustable such that the speed of pipeline inspection device 100 can be altered by altering joining plate 184.

The following methods are understood to be described with reference to pipeline inspection device 100 according to some embodiments of the present disclosure.

Figure 6:
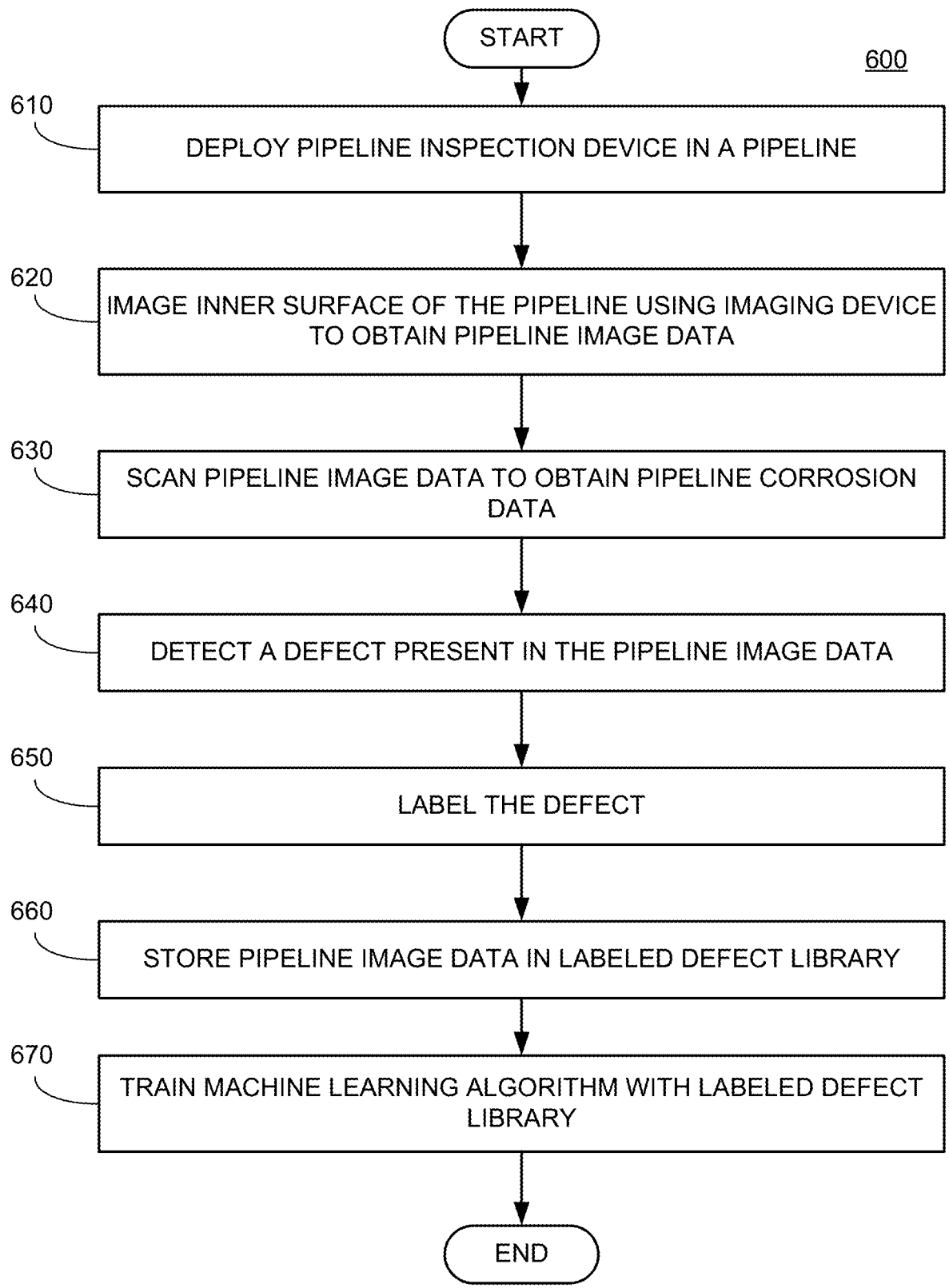
FIG. 6 illustrates a flowchart depicting a method for inspecting pipelines according to some embodiments of the present disclosure.

FIG. 6 illustrates an exemplary pipeline inspection method 600 according to some embodiments of the present disclosure. As shown, in block 610 a pipeline inspection device can be deployed in a pipeline. In some embodiments, to deploy the pipeline inspection device, extendable arms can be extended from diaphragms on the pipeline inspection device such that the pipeline inspection device contacts the inner surface of the pipeline. The contacting can also be achieved through contact members disposed on the extendable arms. Additionally, an odometer arm can contact the inner surface of the pipeline and communicate with a sensor connected to the pipeline imaging device. Additional embodiments of a deployed pipeline inspection device can be found described above. In some embodiments, method 600 can proceed to block 620 or to other method steps not shown.

In block 620, the inner surface of the pipeline can be imaged using an imaging device to obtain pipeline image data. The imaging device is described above and can use a variety of imaging techniques to obtain the pipeline image data. For example, the imaging device can utilize x-ray imaging to obtain pipeline image data. In some embodiments, method 600 can proceed to block 630 or to other method steps not shown.

In block 630, the pipeline image data can be scanned to obtain pipeline corrosion data. In block 640, the pipeline image data can be scanned to detect a defect present in the pipeline image data. For example, the pipeline image data can be scanned using an invariant wavelet-based feature space or a color-based learned feature space based on other images. In some embodiments, block 630 and block 640 can be performed simultaneously. In other embodiments, block 630 and block 640 can be performed separately. Further description of block 630 and block 640 can be found in FIG. 7 and FIG. 8. In some embodiments, method 600 can proceed to block 650 or to other method steps not shown.

In block 650, the defect can be labeled as a defect in the pipeline image data. The defect can further be labeled with additional information, such as the type of defect, a timestamp, a defect position, and the like. In some embodiments, method 600 can proceed to block 660 or to other method steps not shown.

In block 660, the pipeline image data can be stored in the labeled defect library along with the defect label obtained in block 650. In this manner, the pipeline inspection device can be constantly trained and improved in defect detection by training using an ever-expanding labeled defect library. The pipeline inspection device can also utilize such methods to adapt to new environments and constantly improve. In some embodiments, method 600 can proceed to block 670 or to other method steps not shown.

In block 670, a machine learning algorithm can be trained using the labeled defect library. The machine learning algorithm can be trained using neural nets, deep learning, machine vision, named entity recognition, and other techniques. Additionally, the machine learning algorithm can be trained using the labeled defect library with the defect and pipeline image data obtained in block 660. In some embodiments, method 600 can terminate after block 670. However, in other embodiments, method 600 can proceed to other method steps not shown.

Figure 7:
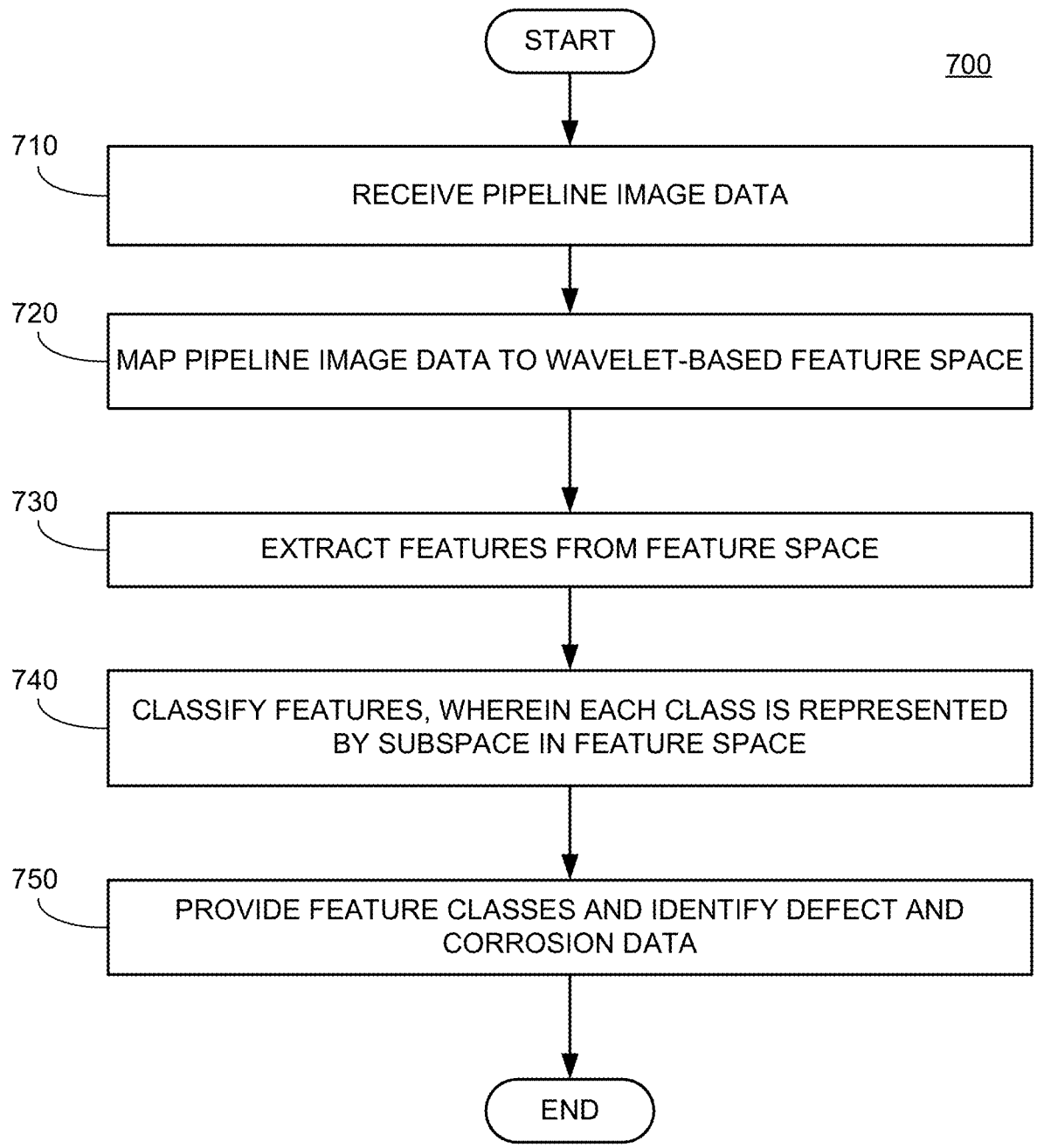
FIG. 7 illustrates a flowchart depicting a method for processing pipeline image data according to some embodiments of the present disclosure.
Figure 8:
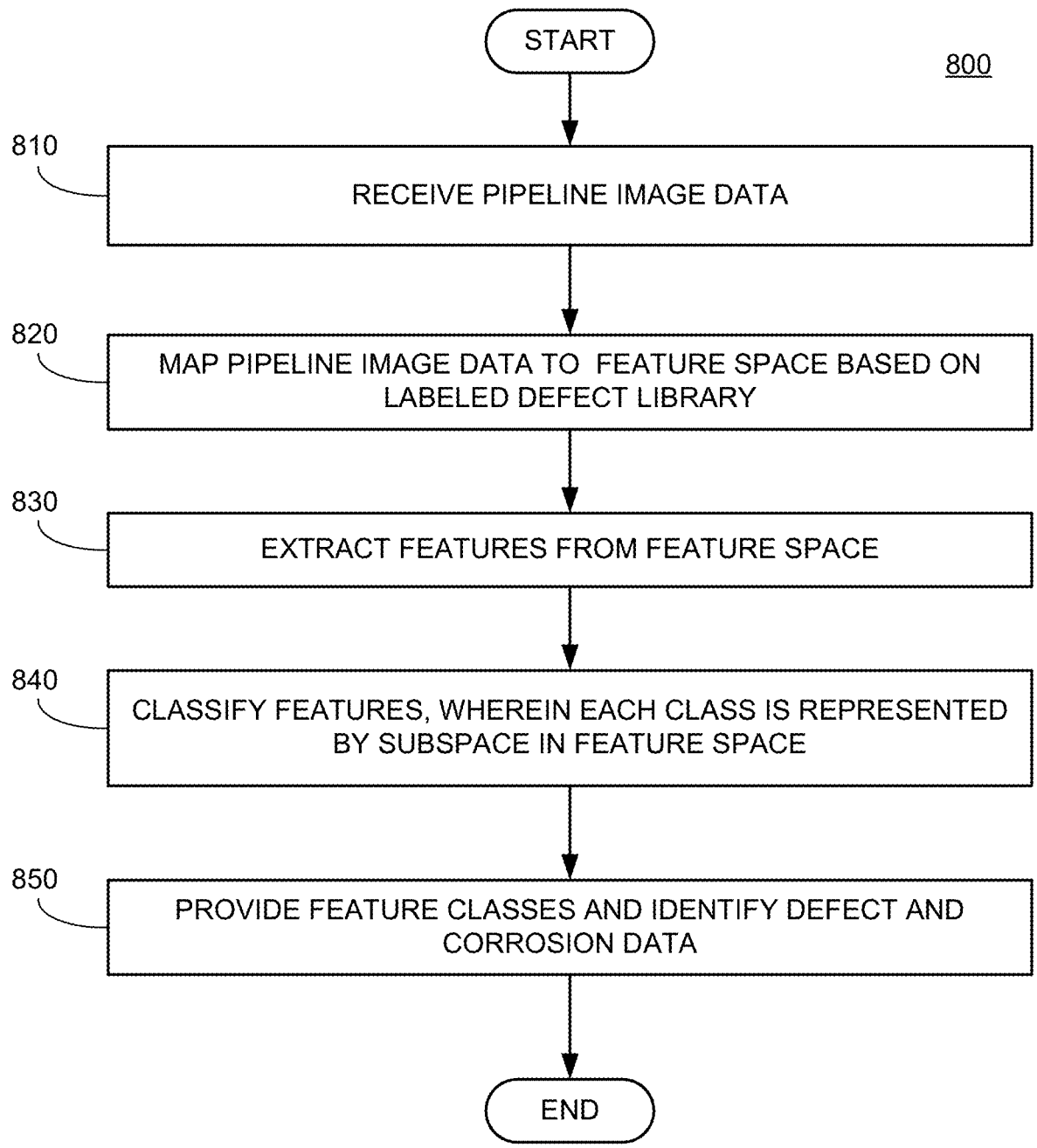
FIG. 8 illustrates a flowchart depicting a method for processing pipeline image data according to some embodiments of the present disclosure.
Figure 9:
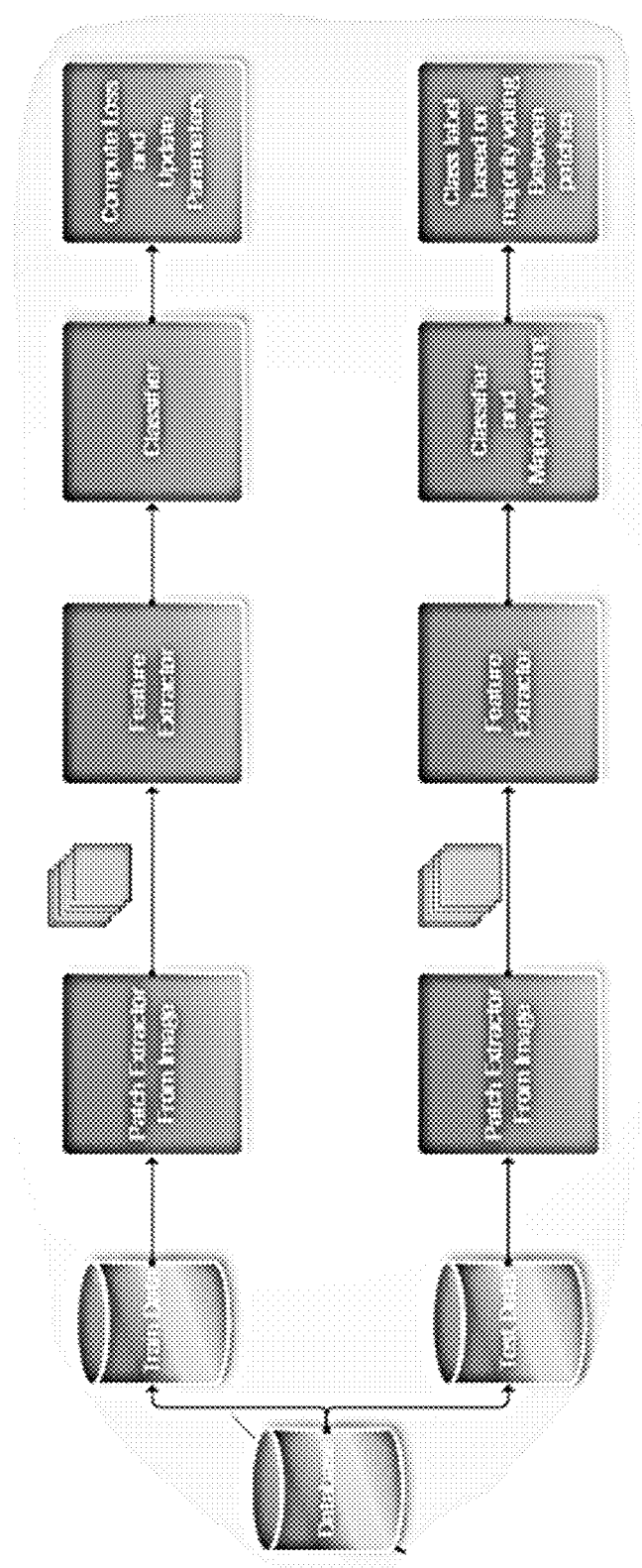
FIG. 9 illustrates a flowchart depicting a method for processing pipeline image data according to some embodiments of the present disclosure.

FIG. 7 and FIG. 8 illustrate exemplary method 700 and method 800 of processing pipeline image data according to some embodiments of the present disclosure. As shown, in block 710 and similarly block 810, pipeline image data can be received to be processed. Pipeline image data can be received from an imaging device depicting an inner surface of a pipeline. In some embodiments, method 700 and method 800 can proceed to block 720 or block 820.

In block 720, the pipeline image data can be mapped to a wavelet-based feature space. Features can be invariant in the wavelet-based feature space, requiring little to no data augmentation. In some embodiments, the wavelet-based feature space may operate on grayscale image data. In some embodiments, method 700 can proceed to block 730 or to other method steps not shown.

In block 820, the pipeline image data can be mapped to a feature space based on the labeled defect library. Data augmentation can be achieved by expanding the labeled defect library, as described above. In such an embodiment, the color data of the image data can be analyzed to improve accuracy and reduce false findings. In some embodiments, method 800 can proceed to block 830 or to other method steps not shown.

In block 730 and similarly block 830, features of the pipeline image data can be extracted from the feature space. For example, features such as sediment deposits or regular wear-and-tear can be extracted in addition to defect features such as cracks and holes. Operating the extraction on the feature space mapped in block 720 and block 820 can improve the accuracy of feature detection. In some embodiments, method 700 and method 800 can proceed to block 740, block 840, or other method steps not shown.

In block 740 and similarly block 840, the extracted features can be classified. Each class used to identify the features can be represented by a subspace in the feature space. For example, detected scratches in the pipe surface can be classified as "wear-and-tear," while gashes or holes in the pipe surface can be classified as "defect." In some embodiments, method 700 and method 800 can proceed to block 750, block 850, or other method steps not shown.

In block 750 and similarly block 850, the feature classifications can be provided along with corrosion data and identified defects. The data and classifications can be provided to other components of the pipeline inspection device or to other processing components to further analyze the data. In some embodiments, method 700 and method 800 can terminate after block 750 and block 850. However, in other embodiments, method 700 and method 800 can proceed to other method steps not shown. Further illustration of method 700 and method 800 can be seen in FIG. 9.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

Exemplary Use Cases

The following exemplary use cases describe examples of a user flow pattern. They are intended solely for explanatory purposes and not limitation.

A pipeline inspection device 100 can be deployed in pipeline 200 to inspect the interior of pipeline 200. Once pipeline inspection device 100 is inside pipeline 200, the device can be deployed using diaphragms 180. Extendable arms 182 can be extended to contact an inner surface of pipeline 200 with joining plate 184 and/or contact members 482. Additionally, odometer arms 186 can be deployed to contact the inner surface of pipeline 200. Diaphragms 180 can be oriented to cause pipeline inspection device 100 to traverse pipeline 200 in a desired direction. The rate of travel of pipeline inspection device 100 can be controlled by automatic braking devices of by pipeline fluid bypassing techniques. The rate of travel can also be adjusted using extendable arms 182 and/or joining plate 184. For example, pipeline inspection device 100 can be slowed by contracting extendable arms 182 and allowing more fluid to bypass diaphragms 180. Conversely, pipeline inspection device 100 can be accelerated by expanding extendable arms 182 and/or joining plate 184 to entrap more fluid with diaphragms 180. Diaphragms 180 can further be in communication with sensor 170 to measure a speed at which odometer arms 186 travel along the inner surface and/or a degree at which extendable arms 182 are extended, amongst other parameters.

In order to inspect the interior of pipeline 200, pipeline inspection device 100 can employ imaging device 130, imaging device 130 either being contained within housing 110 or on the exterior of housing 110, or a combination thereof. Imaging device 130 can be operable to constantly image the interior of pipeline 200 or can be operable to image a certain area of pipeline 200 upon receiving a trigger condition (such as sensor 170 detecting that extendable arms 182 had to contract to move past a dent in pipeline 200). Imaging device 130 can utilized imaging techniques such as photography or infrared imaging to obtain pipeline image data. Imaging device 130 can also utilize light source 134 if necessitated by the imaging technique.

The obtained pipeline image data can be sent to processor 140 and/or storage device 150 to be processed. Memory 160 can also aid in the image processing. The pipeline image data can be scanned to obtain pipeline corrosion data using machine learning algorithm 165. Machine learning algorithm 165 can also detect if a defect is present in pipeline image data. Machine learning algorithm 165 can compare the pipeline image data to a labeled defect library, where a library of images with labeled defects are stored. Machine learning algorithm can also label the defect in the pipeline image data, and the labeled pipeline image data can then be stored in the labeled defect library to expand the library. Machine learning algorithm 165 can also be trained using the labeled defect library, or other machine learning algorithms can be trained using the labeled defect library. In this manner, machine learning algorithm 165 can be constantly trained and improved in defect detection by training using an ever-expanding labeled defect library. Machine learning algorithm 165 can also utilized such methods to adapt to new environments and constantly improve. Once processed for corrosion data and detected defects, the pipeline imaging data can be store or transmitted out of pipeline 200.

Pipeline inspection device 100 can be operable to connect to remote transceiver 220 via antenna 120. In this manner, the imaging data and other obtained data can be transmitted from pipeline inspection device 100 to the outside world. Antenna 120 can be operable to automatically connect to remote transceiver 220 when antenna 120 (and therefore pipeline inspection device 100) is within a predetermined distance from remote transceiver 220. When the automatic connection occurs, the data transfer can be initiated between antenna 120 and remote transceiver 220. Once pipeline inspection device 100 moves out of the predetermined distance, the automatic connection and thus the data transfer can be terminated between antenna 120 and remote transceiver. To facilitate constant connection and data transfer, more than one remote transceiver 220 can be placed along pipeline 200 such that antenna 120 is within the predetermined distance of at least one remote transceiver 220. Such an embodiment can provide pipeline inspection device a constant connection to the outside world and can allow for continuous data flow from pipeline inspection device 100. Once data is received by remote transceiver 220, remote transceiver 220 can transmit the data to other systems not contained in pipeline 200, such as networks, cloud storage, computing devices, storage devices, display devices, and the like.

Therefore, embodiments of the present disclosure can provide for a pipeline inspection device capable of operating under harsh conditions while also possessing the ability to connect with the outside world, learn and adapt to new environments, and reliably detect corrosion and defects in pipelines.

What is claimed is:

1. A pipeline inspection device comprising:
   a housing;
   an antenna;
   an imaging device;
   two or more sets of extendable arms;
   a processor;
   a storage device in communication with the processor; and
   memory in communication with the processor, storing a machine learning algorithm and instructions to be executed by the processor;
   wherein the antenna is operable to communicate with a remote transceiver located on a pipeline through which the pipeline inspection device travels;
   wherein at least one extendable arm extends at an angle from the housing to a contact member operable to contact an inner surface of the pipeline through which the pipeline inspection device travels; and
   wherein the instructions, when executed by the processor, cause the pipeline inspection device to:
      image, using the imaging device, the inner surface of the pipeline through which the pipeline inspection device travels to obtain pipeline image data;
      record a speed at which the pipeline inspection device moves within the pipeline; and
      record the angle at which at least one of the extendable arms of each set of extendable arms extends from the housing to the contact member.

2. The pipeline inspection device of claim 1, wherein the imaging device has one or more lenses.

3. The pipeline inspection device of claim 1, wherein the instructions, when executed by the processor, further cause the pipeline inspection device to:
   scan, using the machine learning algorithm, the pipeline image data to obtain pipeline corrosion data;
   detect, using the machine learning algorithm, if a defect is present in the pipeline image data; and
   transmit, from the antenna to the remote transceiver, the pipeline image data and the pipeline corrosion data.

4. The pipeline inspection device of claim 1, wherein the pipeline inspection device is operable to withstand a pressure of 3000 psig or greater.

5. The pipeline inspection device of claim 1 further comprising a diaphragm extending from the housing;
   wherein the diaphragm shares a longitudinal axis with the housing.

6. The pipeline inspection device of claim 5, wherein the diaphragm comprises an odometer arm:
   in contact with the inner surface of the pipeline; and
   in communication with the memory.

7. The pipeline inspection device of claim 1 further comprising two or more sets of one or more joining plates;
   wherein each set of extendible arms is associated with a respective set of one or more joining plates;
   which each set of one or more joining plates is disposed on a distal end of the extendable arms of the respective set of extendable arms;
   wherein each set of one or more joining plates together form an annular diaphragm in communication with the pipeline radially around the housing;
   wherein each annular diaphragm extends from the housing and is distal from one another along a length of the housing; and
   wherein each annular diaphragm shares a longitudinal axis with the housing.

8. The pipeline inspection device of claim 7, wherein at least one of the annular diaphragms comprises an odometer arm:
   in contact with the inner surface of the pipeline; and
   in communication with the memory.

9. A pipeline inspection device comprising:
   a housing having a length;
   two or more annular diaphragms extending from the housing and distal each other along the length of the housing, each annular diaphragm sharing a longitudinal axis with the housing;
   two or more sets of extendable arms, each extendable arm of each set of extendable arms extending at an angle from the housing;
   an imaging device having one or more lenses;
   a processor; and
   memory in communication with the processor, storing a machine learning algorithm and instructions to be executed by the processor;
   wherein at least one of the extendable arms of each set of extendable arms extends to a contract member operable to contact an inner surface of the pipeline through which the pipeline inspection device travels;
   wherein at least one of the annular diaphragms comprises an odometer arm:
      in contact with the inner surface of the pipeline; and
      in communication with the memory;
   wherein the pipeline inspection device is operable to:
      travel within a pipeline having the inner surface;
      withstand a pressure of 3000 psig or greater; and
      communicate with a remote transceiver; and
   wherein the instructions, when executed by the processor, causes the pipeline inspection device to:
      image, using the imaging device, the inner surface of the pipeline through which the pipeline inspection device travels to obtain pipeline image data;
      record a speed at which the pipeline inspection device moves within the pipeline; and
      record the angle at which at least one of the extendable arms of each set of extendable arms extends from the housing to the contact member.

10. The pipeline inspection device of claim 9 further comprising, for each annular diaphragm:
   a set of one or more joining plates;
   wherein each annular diaphragm is formed by a respective set of one or more joining plates disposed on a distal end of each of the extendable arms of a respective set of two or more extendable arms; and
   wherein each annular diaphragm is in communication with the pipeline radially around the housing.

11. The pipeline inspection device of claim 9 further comprising an antenna operable to communicate with the remote transceiver;
   wherein the instructions, when executed by the processor, further causes the pipeline inspection device to:
      scan, using the machine learning algorithm, the pipeline image data to obtain pipeline corrosion data;
      detect, using the machine learning algorithm, if a defect is present in the pipeline image data; and
      transmit, from the antenna to the remote transceiver, the pipeline image data and the pipeline corrosion data.

12. The pipeline inspection device of claim 11 further comprising a storage device;
   wherein the instructions further cause the pipeline inspection device to, if a defect is present in the pipeline image data:
      label the defect in the pipeline image data;
      store, using the storage device, the pipeline image data in a labeled defect library; and
      train the machine learning algorithm with the labeled defect library; and
   wherein the pipeline inspection device is further operable to detect the defect by comparing the pipeline image data to the labeled defect library.

13. The pipeline inspection device of claim 12, wherein the pipeline image data, the pipeline corrosion data, and if a defect is present in the pipeline image data, data representative of the defect are transmitted from the antenna to the remote transceiver when the antenna is within a predetermined distance from the remote transceiver; and
   wherein the antenna is operable to automatically connect to the remote transceiver when within the predetermined distance.

14. A method for pipeline inspection comprising:
   deploying, in a pipeline, the pipeline inspection device of claim 9; and
   imaging, using the imaging device, the inner surface of the pipeline.

15. The method for pipeline inspection of claim 14 further comprising:
   scanning, using the machine learning algorithm, pipeline image data obtained by the imaging by the imaging device, to obtain pipeline corrosion data; and
   detecting, using the machine learning algorithm, if a defect is present in the pipeline image data.

16. The method for pipeline inspection of claim 15 further comprising:
   labeling the defect in the pipeline image data if a defect is present in the pipeline image data;
   storing, using a storage device, the pipeline image data in a labeled defect library; and
   training the machine learning algorithm with the labeled defect library;
   wherein the detecting comprises comparing the pipeline image data to the labeled defect library.

17. The method for pipeline inspection of claim 16 further comprising recording a speed at which the pipeline inspection device travels within the pipeline.

18. A method for pipeline inspection comprising:
deploying, in a pipeline, the pipeline inspection device of claim 1; and
imaging, using the imaging device, the inner surface of the pipeline.

19. The method for pipeline inspection of claim 18 further comprising:
scanning, using a machine learning algorithm, pipeline image data obtained by the imaging by the imaging device, to obtain pipeline corrosion data; and
detecting, using the machine learning algorithm, if a defect is present in the pipeline image data.

20. The method for pipeline inspection of claim 19 further comprising:
labeling the defect in the pipeline image data if a defect is present in the pipeline image data;
storing, using a storage device, the pipeline image data in a labeled defect library; and
training the machine learning algorithm with the labeled defect library;
wherein the detecting comprises comparing the pipeline image data to the labeled defect library.

* * * * *